(12) United States Patent
Nishijima et al.

(10) Patent No.: US 6,534,579 B1
(45) Date of Patent: Mar. 18, 2003

(54) POLYOLEFIN-BASED RESIN COMPOSITIONS AND FABRICATED PRODUCTS PRODUCED THEREFROM

(75) Inventors: Shigetoshi Nishijima, Yamaguchi-ken (JP); Yohzoh Yamamoto, Yamaguchi-ken (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/437,789

(22) Filed: Nov. 10, 1999

(30) Foreign Application Priority Data

Nov. 19, 1998 (JP) ............................. 10-328714
Feb. 24, 1999 (JP) ............................. 11-046094
May 13, 1999 (JP) ............................. 11-132320

(51) Int. Cl.$^7$ ................................................ C08K 5/06
(52) U.S. Cl. .................. 524/340; 524/343; 524/351; 524/353; 524/370
(58) Field of Search ................. 524/515, 339, 524/340, 343, 351, 352, 353, 370

(56) References Cited

FOREIGN PATENT DOCUMENTS

| EP | 0690063 | | 1/1996 |
|----|---------|---|--------|
| EP | 0690093 | | 1/1996 |
| EP | 0 690 093 A1 | * | 1/1996 |
| JP | 6395246 A | | 4/1988 |
| JP | 08239526 A | * | 9/1996 |
| JP | 8239526 | | 9/1996 |
| JP | 919494 A | | 1/1997 |
| JP | 948895 A | | 2/1997 |
| JP | 9176396 A | | 7/1997 |
| WO | WO-95/25140 | * | 9/1995 |
| WO | WO 9525140 | | 9/1995 |

* cited by examiner

Primary Examiner—David W. Wu
Assistant Examiner—R. Harlan
(74) Attorney, Agent, or Firm—Birch, Stewart, Kolasch & Birch, LLP

(57) ABSTRACT

A resin composition is a transparent, low-water-absorption polyolefin-based resin composition containing a sorbitol-based derivative of a particular structure, whose polyolefin-based resin having crystallinity of 0% to 20% shows haze of not more than 10%, total light transmittance of not less than 80%, when measured in accordance with ASTM D1003 using an article 3 mm thick molded therefrom as the test specimen, and shows water absorption of not more than 0.1% after 100-hour immersion in water at 23° C., or whose polyolefin-based resin comprises a cyclic olefin-based polymer comprising a cyclic olefin of a particular structure. Preferable examples of the polyolefin-based resin include the aforesaid cyclic olefin-based polymer and a polycyclohexane-based resin. This resin composition is used for transparent resin moldings that are useful as optical products and moldings for medical and pharmaceutical use because it has excellent transparency, heat resistance, rigidity and water vapor resistance and the decline in its transparency in a high-temperature/high-humidity atmosphere will be little.

16 Claims, No Drawings

POLYOLEFIN-BASED RESIN COMPOSITIONS AND FABRICATED PRODUCTS PRODUCED THEREFROM

BACKGROUND OF THE INVENTION

The present invention relates to polyolefin-based compositions having transparency and low water absorption. The invention relates particularly to polyolefin-based resin compositions whose transparency show little decline at a high-temperature/high-humidity atmosphere and fabricated products produced therefrom.

Generally, transparent resins have been used for medical, food, laboratory equipment, optical and other applications as well as for industrial and general-consumer-item applications because it is easy to check the contents of those containers, packaging materials, etc. formed from the resins and it is also easy to carry and process such containers, packaging materials, etc. Specifically, those resins are suitable for use for eyeglass lenses, pickup lenses, fθ lenses and other lenses for optical equipment, and optical recording media such as MO's, DVD's and CD's.

In such applications, these resins are exposed to an atmosphere of high temperature and high humidity in some cases. For example, when the resins are used in containers for food, pharmaceuticals, etc., these containers are subjected to cleaning treatment by use of hot water and steam for the purposes of sterilization. Especially for containers for pharmaceuticals, steam sterilization is normally carried out. Cyclic olefin-based polymer and poly-4-methyl-1-pentene-based resin, which are used for containers for medical and pharmaceutical use to be sterilized with steam because of their excellent heat resistance, rigidity and water vapor resistance as well as their transparency, have suffered a decline in transparency in some cases under some steam sterilization conditions.

Furthermore, when those resins are used for optical products such as optical equipment lenses and optical recording media and products for food and pharmaceuticals packaging applications, such products are placed in a severe environment at high temperature and high humidity in the course of their transportation, among other things, in some cases. In such cases, fine cracks and voids occur in the products probably because the small amount of water having entered the products condensates as the ambient temperature falls. This has caused a loss of transparency of the products in some cases, making the appearance look milk-white. Such decline in transparency in an high-temperature/high-humidity atmosphere is a phenomenon that tends to occur with transparent resins showing low water absorption, and it has been observed with styrene-based polymer, cyclic olefin-based polymer and poly-4-methyl-1-pentene-based resin.

SUMMARY OF THE INVENTION

The objects of the present invention is to provide polyolefin-based resin compositions that show excellent transparency, heat resistance, rigidity and water vapor resistance and suffer little decline in transparency in a high-temperature/high-humidity atmosphere and those polyolefin-based resin moldings obtained from the aforesaid polyolefin-based resin compositions which are suitable for use for optical products and moldings for medical and pharmaceutical use.

Other and further objects, features and advantages of the invention will appear more fully from the following description.

According to the present invention, the polyolefin-based resin composition comprises a polyolefin-based resin having crystallinity of 0% to 20% which shows haze of not more than 10%, total light transmittance of not less than 80%, when measured in accordance with ASTM D1003 using an article 3 mm thick molded therefrom as the test specimen, and water absorption of not more than 0.1% after 100-hour immersion in water at 23° C., and a sorbitol-based derivative which is represented by any of the following general formulas (I-a) to (I-e):

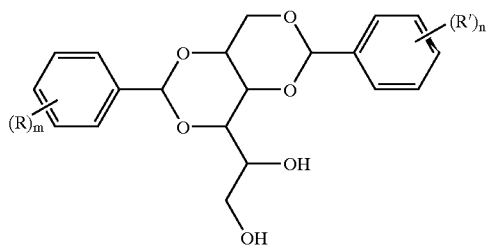

Formula (I-a)

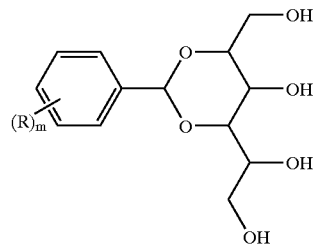

Formula (I-b)

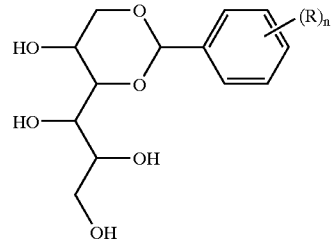

Formula (I-c)

(In the above formulas (I-a) to (I-c), R and R', each of which may be a same or different, are any of an alkyl group having 1 to 8 carbon atoms, a halogen atom and an alkoxy group having 1 to 4 carbon atoms, and m and n are, each independently of each other, any of integers from 0 to 3.)

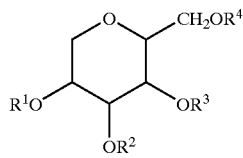

Formula (I-d)

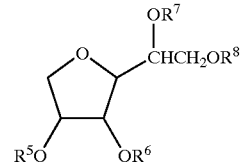

Formula (I-e)

(In he above formulas (I-d) and (I-e), $R^1$ to $R^8$ are either an aliphatic acyl group having 10 to 30 carbon atoms or a hydrogen atom.)

The aforesaid polyolefin-based resin is preferably at least one of (a) a cyclic olefin-based polymer selected from among the following (A-1), (A-2), (A-3) and (A-4) and (b) a polycyclohexane-based resin:

(A-1): An a-olefin-cyclic olefin random copolymer obtained by copolymerizing the a-olefin having 2 to 20 carbon atoms and the cyclic olefin represented by the following formula (II) or (III):

Formula (II)

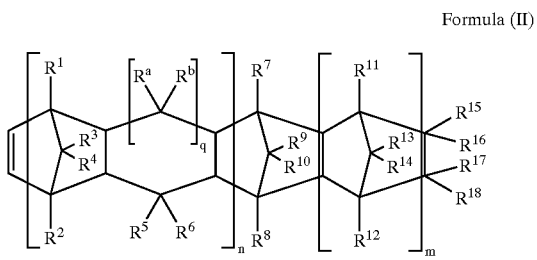

(In the above formula (II), n is 0 or 1, m is integers of 0 or a number not less than 1, q is 0 or 1, $R^1$ to $R^{18}$ and $R^a$ and $R^b$ are, each independently of each other, a hydrogen atom, a halogen atom or a hydrocarbon group, and $R^{15}$ to $R^{18}$ may be bonded with each other to form a monocyclic or polycyclic ring, while the said monocyclic or polcyclic ring may have a double bond or $R^{15}$ and $R^{16}$, or $R^{17}$ and $R^{18}$, may form an alkylidene group.)

Formula (III)

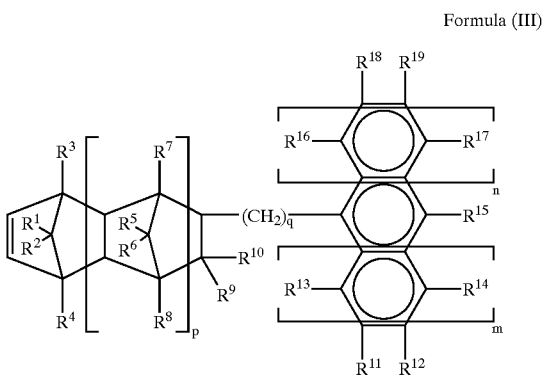

(In the above formula (III), p and q are integers of 0 or a number not less than 1, m and n are 0, 1 or 2, $R^1$ to $R^{19}$ are, each independently of each other, a hydrogen atom, a halogen atom, an aliphatic hydrocarbon group, an alicyclic hydrocarbon group, an aromatic hydrocarbon group or an alkoxy group, while the carbon atom to which $R^9$ and $R^{10}$ are attached and the carbon atom to which $R^{13}$ or $R^{11}$ is attached may be bonded directly or via an alkylene group having 1 to 3 carbon atoms and, when n=m=0, $R^{15}$ and $R^{12}$, or $R^{15}$ and $R^{19}$, may be bonded with each other to form a monocyclic or polycyclic aromatic ring.)

(A-2): A ring-opening polymer or copolymer of the cyclic olefin represented by the above formula (II) or (III).
(A-3): A hydride of the ring-opening polymer or copolymer of (A-2) above.
(A-4): A graft-modified material of (A-1), (A-2) or (A-3) above.

Furthermore, the polyolefin-based resin composition of the present invention comprises a polyolefin-based resin comprising at least one of the cyclic olefin-based polymers selected from among the group comprising the following (A-1), (A-2), (A-3) and (A-4) and a sorbitol-based derivative represented by the above general formulas (I-a) to (I-e).

The present invention provides polyolefin-based resin moldings formed from the aforesaid resin composition, which are suitable for use for optical products and moldings for medical and pharmaceutical use.

DETAILED DESCRIPTION OF THE PREFERRED EMBODIMENTS

The polyolefin-based resin composition comprises a polyolefin-based resin having transparency and low water absorption and a particular sorbitol-based derivative. First, an explanation is given of the polyolefin-based resin.

Polyolefin-based Resin:

The polyolefin-based resin used in the present invention is composed mostly of carbon atoms and hydrogen atoms and has such transparency that the haze is preferably not more than 10%, more preferably not more than 5%, the total light transmittance is normally not less than 70%, preferably not less than 80%, more preferably not less than 85% when measured in accordance with ASTM D1003 using an article 3 mm thick molded therefrom as the test specimen, and the water absorption is preferably not more than 0.1% after 100-hour immersion in water at 23° C. Moreover, in the present invention, for the polyolefin-based resin, low-crystallinity or non-crystalline polyolefin-based resins are preferable in that they show excellent transparency, and the crystallinity as measured by X-ray diffractometry is preferably 0% to 20%, more preferably 0% to 10%, much more preferably 0% to 2%, most preferably 0%.

Examples of the aforesaid polyolefin-based resin include cyclic olefin-based polymer, polycyclohexane-based resin, and in addition those resins which have a hydrophilic functional group such as the hydroxyl group, ester group, carbonyl group and amide group in its basic skeleton consisting of carbon atoms and hydrogen atoms, while the content of such functional group is low and the water absorption of such resins is within the aforesaid range. Specific examples of such resins include those cyclic olefin-based resins modified with an acid anhydride represented by maleic acid within the scope of the present invention.

Out of these, at least one of (a) a cyclic olefin-based polymer selected from among the following (A-1), (A-2), (A-3) and (A-4) and (b) a polycyclohexane-based resin is preferable. Especially, the aforesaid cyclic olefin-based polymer is preferable. Given below is a specific explanation of each of the resins.

In the present invention, as the cyclic olefin-based polymer (a), at least one selected from among:
(A-1): A random copolymer of α-olefin having 2 to 20 carbon atoms and the cyclic olefin represented by the formula (II) or (III) below.
(A-2): A ring-opening polymer or copolymer of the cyclic olefin represented by the formula (II) or (III) below.
(A-3): A hydride of the ring-opening polymer or copolymer of (A-2) above.
(A-4): A graft-modified material of (A-1), (A-2) or (A-3) above.

The cyclic olefin-based polymer (a) used in the present invention shows a glass transition temperature (Tg) of preferably not less than 70° C., more preferably 70° C. to 250° C., much more preferably 120° C. to 180° C. as measured by DCS.

Furthermore, the cyclic olefin-based polymer (a) used in the present invention is non-crystalline or of low crystallinity, with its crystallinity being normally not more than 20%, preferably not more than 10%, much more preferably not more than 2%, most preferably 0% as measured by X-ray diffractometry.

Moreover, the intrinsic viscosity (η) as measured in decalin at 135° C. is normally 0.01 to 20 dl/g, preferably 0.03 to 10 dl/g, more preferably 0.05 to 5 dl/g. The melt flow rate (MFR) as measured at a temperature of 260° C. and a load of 2.16 kg in accordance with ASTM D1238 is normally 0.1 to 200 g/10 min., preferably 1 to 100 g/10 min., more preferably 5 to 50 g/10 min.

Furthermore, the softening point of the cyclic olefin-based polymer (a) as the softening point (TMA) as measured by the thermal mechanical analyzer is normally not less than 30° C., preferably not less than 70° C., more preferably 80° C. to 260° C.

Given below is an explanation of the cyclic olefin represented by the formula (II) or (III) which makes up the cyclic olefin-based polymer (a) used in the present invention.

The cyclic olefin-based polymer (a) used in the present invention comprises a cyclic olefin represented the following formula (II) or (III).

Formula (II)

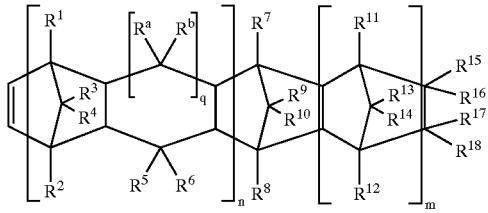

In the above formula (II), n is 0 or 1, m is integers of 0 or a number not less than 1, and q is 0 or 1. When q is 1, $R^a$ and $R^b$ are, each independently of each other, the atoms and hydrocarbon groups as described below, and when q is 0, the bonds of $R^a$ and $R^b$ disappear and a five-membered ring is formed with their carbon atoms bonding each other.

$R^1$ to $R^{18}$ and $R^a$ and $R^b$ are, each independently of each other, a hydrogen atom, a halogen atom or a hydrocarbon group. In this case, the halogen atom is fluorine atom, chlorine atom, bromine atom or iodine atom.

Examples of the hydrocarbon group, each and independently of each other, include normally the alkyl group having 1 to 20 carbon atoms, the cycloalkyl group and aromatic hydrocarbon group having 3 to 15 carbon atoms. More specifically, for examples of the alkyl group, the methyl group, ethyl group, propyl group, isopropyl group, amyl group, hexyl group, octyl group, decyl group, dodecyl group and octadecyl group may be cited. For an example of the cycloalkyl group, the cyclohexyl group can be cited, and for examples of the aromatic hydrocarbon group, the phenyl group and the naphtyl group can be cited.

The hydrogen atoms of these hydrocarbon groups may be substituted by halogen atom.

Furthermore, in the above formula (II), $R^{15}$ to $R^{18}$ may be bonded with each other (in mutual cooperation) to form a monocyclic or polycyclic ring, while the said monocyclic or polcyclic ring may have a double bond.

Formula (III)

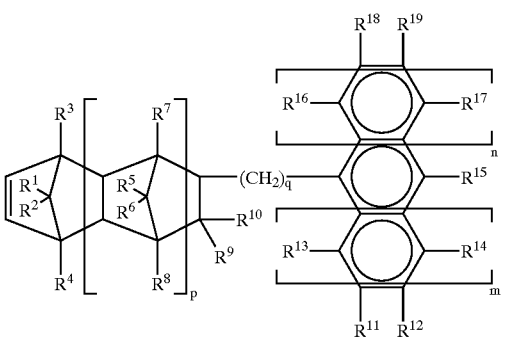

In the above formula (III), p and q are integers of 0 or a number not less than 1, m and n are 0, 1 or 2, $R^1$ to $R^{19}$ are, each independently of each other, a hydrogen atom, a halogen atom, a hydrocarbon group or an alkoxy group.

In this case, the halogen atom has the same meaning as that in the fromula (II).

Examples of the hydrocarbon, each independently of each other, include the alkyl group having 1 to 20 carbon atoms, the halogenated alkyl group having 1 to 20 carbon atoms, the cycloalkyl group or aromatic hydrocarbon group having 3 to 15 carbon atoms.

More specifically, for examples of the alkyl group, the methyl group, ethyl group, propyl group, isopropyl group, amyl group, hexyl group, octyl group, decyl group, dodecyl group and octadecyl group may be cited. For an example of the cycloalkyl group, the cyclohexyl group can be cited, and for examples of the aromatic hydrocarbon group, the aryl group and the aralkyl group, specifically the phenyl group, tolyl group, naphtyl group, benzyl group and phenylethyl group, can be cited.

Furthermore, for examples of the alkoxy group, the methoxy group, ethoxy group and propoxy group can be cited. The hydrogen atoms of these hydrocarbon groups and alkoxy groups may be substituted by florine atom, chlorine atom, bromine atom or iodine atom.

Here, the carbon atom to which $R^9$ and $R^{10}$ are attached, and the carbon atom to which $R^{13}$ is attached, or the carbon atom to which $R^{11}$ is attached may be bonded directly or via the alkylene group having 1 to 3 carbon atoms. In other words, in the case of the aforesaid two carbon atoms are bonded via the alkylene group, the group represented by $R^9$ and $R^{13}$ or the group represented by $R^{10}$ and $R^{11}$ form in mutual cooperation any of the alkylene group of the methylene group (—$CH_2$—), ethylene group (—$CH_2CH_2$—) and propylene group (—$CH_2CH_2CH_2$—).

Furthermore, when n=m=0, $R^{15}$ and $R^{12}$, or $R^{15}$ and $R^{19}$, may be bonded with each other to form a monocyclic or polycyclic aromatic ring. For examples of such monocyclic or polycyclic aromatic ring, a group having the following $R^{15}$ and $R^{12}$ further forming an aromatic ring can be cited.

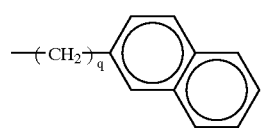

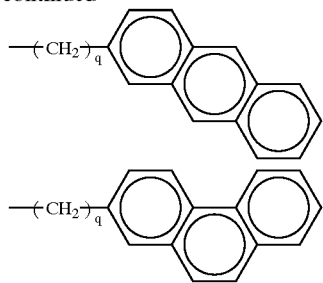

Here, q has the same meaning as q in the formula (III).

An specific example of the cyclic olefin represented by the formula (II) or (III) is given below. For example, bicyclo[2.2.1]-2-heptene (another name: norbornene) represented by the following general formula (wherein the figures of 1 to 7 stand for the position numbers of carbon) and a derivative obtained by substituting the hydrogen atoms of such compound by the hydrocarbon group:

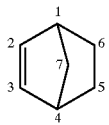

Examples of such substituting hydrocarbon include 5-methyl, 5,6-dimethyl, 1-methyl, 5-ethyl, 5-n-butyl, 5-isobutyl, 7-methyl, 5-phenyl, 5-methyl-5-phenyl, 5-benzyl, 5-tril, 5-(ethylphenyl), 5-(isopropylphenyl), 5-(biphenyl), 5-(β-naphtyl), 5-(α-naphtyl), 5-(anthracenyl) and 5,6-diphenyl.

Moreover, examples of other derivatives include bicyclo [2.2.1]-2-heptene derivatives such as cyclopentadiene-acenaphthylene adduct, 1,4-methano-1,4,4a,9a-tetrahydrofluorene, and 1,4-methano-1,4,4a,5,10,10a-hexahydroanthracene.

In addition, other examples include tricyclo[4.3.0.1$^{2,5}$]-3-decene derivatives such as tricyclo[4.3.0.1$^{2,5}$]-3-decene, 2-methyltricyclo[4.3.0.1$^{2,5}$]-3-decene and 5-methyltricyclo[4.3.0.1$^{2,5}$]-3-decene, tricyclo[4.4.0.1$^{2,5}$]-3-undecene derivatives such as tricyclo[4.4.0.1$^{2,5}$]-3-undecene and 10-methyltricyclo[4.4.0.1$^{2,5}$]-3-undecene, tetracyclo [4.4.0.1$^{2,5}$.1$^{7,10}$]-3-dodecene (hereinafter called simply "tetracyclododecene") represented by the following formula, and derivatives obtained by substituting the hydrogen atoms of these by the hydrocarbon group:

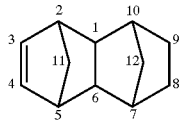

Examples of such substituting hydrocarbon group include 8-methyl, 8-ethyl, 8-propyl, 8-butyl, 8-isobutyl, 8-hexyl, 8-cyclohexyl, 8-stearyl, 5,10-dimethyl, 2,10-dimethyl, 8,9-dimethyl, 8-ethyl-9-methyl, 11,12-dimethyl, 2,7,9-trimethyl, 2,7-dimethyl-9-ethyl, 9-isobutyl-2,7-dimethyl, 9,11,12-trimethyl, 9-ethyl-11,12-dimethyl, 9-isobutyl-11,12-dimethyl, 5,8,9,10-tetramethyl, 8-ethylidene, 8-ethylidene-9-methyl, 8-ethylidene-9-ethyl, 8-ethylidene-9-isopropyl, 8-ethylidene-9-butyl, 8-n-propylidene, 8-n-propylidene-9-methyl, 8-n-propylidene-9-ethyl, 8-n-propylidene-9-isopropyl, 8-n-propylidene-9-butyl, 8-isopropylidene, 8-isopropylidene-9-methyl, 8-isopropylidene-9-ethyl, 8-isopropylidene-9-isopropyl, 8-isopropylidene-9-butyl, 8-chloro, 8-bromo, 8-fluoro, 8,9-dichloro, 8-phenyl, 8-methyl-8-phenyl, 8-benzyl, 8-tril, 8-(ethylphenyl), 8-(isopropylphenyl), 8,9-diphenyl, 8-(biphenyl), 8-(β-naphthyl), 8-(α-naphtyl), 8-(anthracenyl) and 5,6-diphenyl.

In addition, other examples include tetracyclo [4.4.0.1$^{2,5}$.1$^{7,10}$]-3-dodecene derivatives such as adducts of (cyclopentadiene-acenaphthylene adduct) and cyclopentadiene, pentacyclo[6.5.1.1$^{3,6}$.0$^{2,7}$.0$^{9,13}$]-4-pentadecene and its derivatives, pentacyclo[7.4.0.1$^{2,5}$.1$^{9,12}$.0$^{8,13 2}$]-3-pentadecene and its derivatives, pentacyclo [8.4.0.1$^{2,5}$.1$^{9,12}$.0$^{8,13}$]-3-hexadecene and its derivatives, pentacyclo[6.6.1$^{3,6}$.0$^{2,7}$.0$^{9,14}$]-4-hexadecene and its derivatives, hexacyclo[6.6.1.1$^{3,6}$,1$^{10,13}$.0$^{2,7}$.0$^{9,14}$]-4-heptadecene and its derivatives, heptacyclo [8.7.0.1$^{2,9}$.1$^{4,7}$.1$^{11,17}$.0$^{3,8}$.0$^{12,16}$]-5-eicosene and its derivatives, heptacyclo[8.7.0.1$^{3,6}$.1$^{10,17}$.1$^{12,15}$.0$^{2,7}$.0$^{11,16}$]-4-eicosene and its derivatives, heptacyclo[8.8.0.1$^{2,9}$.1$^{4,7}$.1$^{11,18}$.0$^{3,8}$.0$^{12,17}$]-5-heneicosene and its derivatives, octacyclo [8.8.0.1$^{2,9}$.1$^{4,7}$.1$^{11,18}$.1$^{13,36}$.0$^{3,8}$.0$^{12,17}$]-5-docosene and its derivatives, and nonacyclo[10.9.1.1$^{4,7}$.1$^{13,20}$.1$^{15,18}$.0$^{2,10}$.0$^{3,8}$.0$^{12,21}$.0$^{14,19}$]-5-pentacosene and its derivatives.

Specific examples of the cyclic olefin represented by the above formula (II) or (III) that may be used in the present invention are as shown above. The more specific structure of these compounds are shown in the paragraphs 0032 to 0054 of the specification of Japanese Patent Publication HEI 7-145213, and the compounds as cited as examples in the aforesaid specification may also be used in the present invention.

As the method for manufacturing the aforesaid cyclic olefin represented by the above formula (II) or (III), the Diels-Alder reaction of cyclopentadiene and an olefin having a corresponding structure may be cited, for example.

These cyclic olefins may be used singly or in combination with not less than two of them.

The cyclic olefin-based polymer (a) used in the present invention may be manufactured by using the cyclic olefin represented by the above formula (II) or (III) and selecting conditions as required in accordance with the methods proposed in Japanese Patent Publications SHO 60-168708, SHO 61-120816, SHO 61-115912, SHO 61-115916, SHO 61-271308, SHO 61-272216, SHO 62-252406 and SHO 62-252407, for example.

(A-1) α-olefin-cyclic olefin random copolymer:

The α-olefin-cyclic olefin random copolymer (A-1) contains normally 20 to 95 mol %, preferably 30 to 90 mol %, of the component unit derived from α-olefin having 2 to 20 carbon atoms and normally 5 to 80 mol %, preferably 10 to 70 mol %, of the component unit derived from cyclic olefin. The composition ratios of α-olefin unit and cyclic olefin unit are determined by use of $^{13}$C-NMR.

Given here is an explanation of the α-olefin having 2 to 20 carbon atoms which constitutes the α-olefin-cyclic olefin random copolymer (A-1). The α-olefin may be in either straight-chain or branched state, and its examples include straight-chain α-olefins having 2 to 20 carbon atoms such as ethylene, propylene, 1-butene, 1-pentene, 1-hexene, 1-octene, 1-decene, 1-dodecene, 1-tetradecene, 1-hexadecene, 1-octadecene and 1-eicosene, and branched α-olefins having 4 to 20 carbon atoms such as 3-methyl-1-butene, 3-methyl-1-pentene, 3-ethyl-1-pentene, 4-methyl-1-pentene, 4-methyl-1-- hexene, 4,4-dimethyl-1-hexene, 4,4-dimethyl-1-pentene, 4-ethyl-1-hexene and 3-ethyl-1-hexene. Out of these, straight-chain α-olefins having 2 to 4 carbon atoms are preferable, and ethylene is particularly preferable. These straight-chain or branched α-olefins may be used singly or in combination with not less than two of them.

In this α-olefin-cyclic olefin random copolymer (A-1), the aforesaid component unit derived from α-olefin having 2 to 20 carbon atoms and the aforesaid component unit derived from cyclic olefin are bonded in random arrangement, substantially forming a linear structure. It can be confirmed, from the fact that when the copolymer is dissolved in an organic solvent, there is no insoluble matter contained in the solution, that this copolymer is substantially linear and does not substantially have a gel-like crosslinked structure. For instance, this can be confirmed by the fact that the copolymer dissolves completely in decalin at 135° C. when the intrinsic viscosity (η) is measured.

In the α-olefin-cyclic olefin random copolymer (A-1) used in the present invention, at least part of the aforesaid cyclic olefin represented by the above formula (II) or (III) is considered to constitute the repeating unit in the following formula (IV) or (V):

Formula (IV)

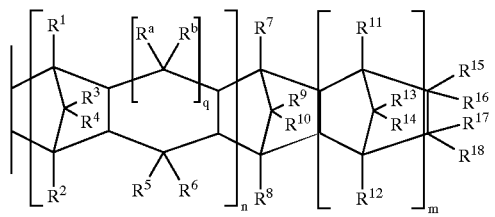

In the above formula (IV), n, m, q, $R^1$ to $R^{18}$, and $R^a$ and $R^b$ have the same meanings as those of the formula (II).

Formula (V)

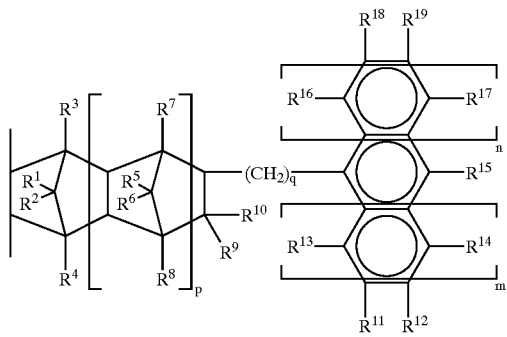

In the above formula (V), n, m, p, q and $R^1$ to $R^{19}$ have the same meanings as those of the formula (III).

Furthermore, the α-olefin-cyclic olefin random copolymer (A-1) used in the present invention may have a component unit derived from other copolymerizable monomers to such extent that the purpose of the present invention will not be thwarted.

Examples of such other monomers include olefins other than the aforesaid α-olefin having 2 to 20 carbon atoms or cyclic olefin, specifically cycloolefins such as cyclobutene, cyclopentene, cyclohexene, 3,4-dimethylcyclopentene, 3-methylcyclohexene, 2-(2-methylbutyl)-1-cyclohexene, cyclooctene and 3a,5,6,7a-tetrahydro-4,7-methano-1H-indene, and nonconjugated dienes such as 1,4-hexadiene, 4-methyl-1,4-hexadiene, 5-methyl-1,4-hexadiene, 1,7-octadiene, dicyclopentadiene and 5-vinyl-2-norbornene.

These other monomers may be used singly or in combination with each other. In the α-olefin-cyclic olefin random copolymer (A-1), the component unit derived from any of such other monomers may be contained in an amount of normally not more than 20 mol %, preferably not more than 10 mol%.

The α-olefin-cyclic olefin random copolymer (A-1) used in the present invention may be manufactured by the manufacturing methods disclosed in the aforesaid Japanese Patent Publications using α-olefin having 2 to 20 carbon atoms and the cyclic olefin represented by the formula (II) or (III). Out of thesemethods, the method is preferable in which the α-olefin-cyclic olefin random copolymer (A-1) is manufactured by conducting the copolymerization reaction in a hydrocarbon solvent, using a catalyst formed from a vanadium compound soluble in such hydrocarbon solvent and an organic aluminum compound as the catalyst.

Furthermore, a solid metallocene-based catalyst comprising elements in the IV Group of the Periodic Table may be used in the aforesaid copolymerization. The solid metallocene-based catalyst comprising elements in the IV Group of the Periodic Table refers to a transition metal compound containing a ligand having the cyclopentadienyl skeleton and a catalyst comprising an organic aluminumoxy compound and an organic aluminum compound that is added as required. The transition metals in the IV Group of the Periodic Table are zirconium, titanium and hafnium, and these transition metals have a ligand containing at least one cyclopentadienyl skeleton. For examples of such ligand containing the cyclopentadienyl skeleton, a cyclopentadienyl group or indenyl group whose hydrogen atoms may have been substituted by alkyl groups, tetrahydroindenyl group and fluorenyl group may be cited. These groups may be bonded via another group such as the alkylene group. Further, for examples of ligands other than the ligand containing the cyclopentadienyl skeleton, the alkyl group, cycloalkyl group, aryl group, aralkyl group and other groups may be cited.

Moreover, for the organic aluminumoxy compound and the organic aluminum compound, the ones that are normally used in the manufacture of polyolefins may be used. For such solid etallocene-based catalyst comprising elements in the IV Group of the Periodic Table, the catalysts described in Japanese Patent Publications SHO 61-221206, SHO 64-106 and HEI 2-173112 may be used.

(A-2) Cyclic olefin ring-opening polymer or copolymer:

The cyclic olefin ring-opening polymer or copolymer (A-2) is the ring-opening polymer of the cyclic olefin represented by the aforesaid formula (II) or (III) or a copolymer containing the ring-opening polymer unit of the cyclic olefin represented by the aforesaid formula (II) and/or (III). In the case of copolymer, a combination of not less than two different cyclic olefins is used.

In the ring-opening polymer or ring-opening copolymer of the cyclic olefin, at least part of the aforesaid cyclic olefin represented by the above formula (II) or (III) is considered to constitute the repeating unit in the following formula (VI) or (VII):

Formula (VI)

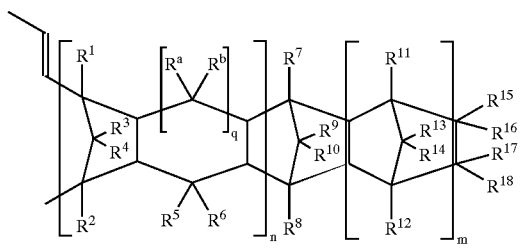

In the above formula (VI), n, m, q, $R^1$ to $R^{18}$, and $R^a$ and $R^b$ have the same meanings as those of the formula (II).

Formula (VII)

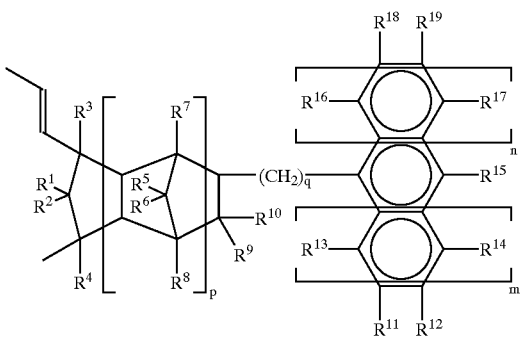

In the above formula (VII), n, m, p, q and $R^1$ to $R^{19}$ have the same meanings as those of the formula (III).

The aforesaid ring-opening polymer or ring-opening copolymer may be manufactured by the manufacturing methods disclosed in the aforesaid Japanese Patent Publications. For example, the ring-opening polyer or ring-opening coplmrmyb manufactured by polymerizing or copolymerizing the cyclic olefin represented by the aforesaid formula (II) in the presence of a ring-opening polymerization catalyst. For the ring-opening polymerization catalyst, a catalyst comprising a halide, nitrate or acetylacetone compound of a metal selected from among ruthenium, rhodium, palladium, osmium, indium and platinum, and a reducing agent or a catalyst comprising a halide or acetylacetone compound of a metal selected from among titanium, palladium, zirconium and molybdenum, and an organic aluminum compound.

(A-3) Hydride of ring-opening polymer or copolymer:

The hydride of ring-opening polymer or copolymer (A-3) is obtained by hydrogenating the ring-opening polymer or copolymer (A-2) obtained as described above in the presence of a hydrogenation catalyst already known to the public.

In the aforesaid hydride of the ring-opening polyer or copolymer (A-3), at least part of the cyclic olefin represented by the above formula (II) or (III) is considered to constitute the repeating unit in the following formula (VIII) or (IX):

Formula (VIII)

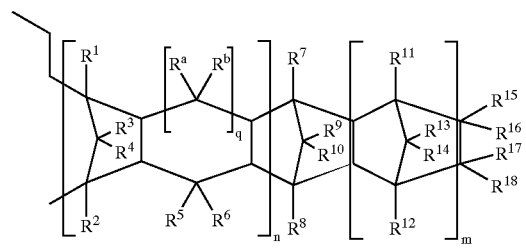

In the above formula (VIII), n, m, q, $R^1$ to $R^{18}$, and $R^a$ and $R^b$ have the same meanings as those of the formula (II).

Formula (IX)

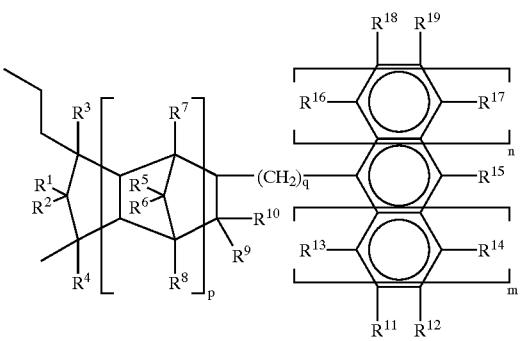

In the above formula (IX), n, m, p, q and $R^1$ to $R^{19}$ have the same meanings as those of the formula (III).

(A-4) Graft-modified material:

The graft-modified material of cyclic olefin-based polymer (A-4) is a graft-modified material of the aforesaid α-olefin-cyclic olefin random copolymer (A-1), ring-opening polymer or copolymer of cyclic olefin (A-2) or hydride of ring-opening polymer or copolymer (A-3).

For an example of the modifier used here, unsaturated carboxylic acids may be normally cited. Specific examples include unsaturated carboxylic acid such as acrylic acid, methacrylic acid, maleic acid, fumaric acid, tetrahydrophthalic acid, itaconic acid, citraconic acid, crotonic acid, isocrotonic acid, endo-cis-bicyclo[2.2.1]hepto-5-en-2,3-dicarboxylic acid (Nadic Acid™) and such derivatives of these unsaturated carboxylic acid such as unsaturated carboxylic anhydride, unsaturated carboxylic halide, unsaturated carboxylic amide, unsaturated carboxylic imide and esterified compounds of unsaturated carboxylic acid.

More specific examples of derivatives of unsaturated carboxylic acid include maleic anhydride, citraconic anhydride, malenyl chloride, maleimide, monomethyl maleate, dimethyl maleate and glycidyl maleate.

Out of these, α,β-unsaturated dicarboxylic acid and α,β-unsaturated dicarboxylic anhydride, such as maleic acid, Nadic Acid™, and anhydrides of these acids, are used preferably. These modifiers may be used in combination with not less than two of them.

The aforesaid graft-modified materials of cyclic olefin-based polymer may be produced by carrying out graft polymerization by adding a modifier to cyclic olefin-based polymer in such manner that an intended modification rate is achieved or by preparing in advance a modified material showing a high modification rate and then mixing this modified material with unmodified cyclic olefin-based polymer in such manner that an intended modification rate is achieved.

The polymer modification methods already known to the public may be used to obtain a graft-modified material of cyclic olefin-based polymer from cyclic olefin-based polymer and a modifier. For example, such graft-modified material may be obtained by the method in which the graft polymerization of cyclic olefin-based polymer in a melted state is carried out with a modifier added to the cyclic olefin-based polymer or the method in which the graft reaction of cyclic olefin-based polymer is carried out with a modifier added to the solution of cyclic olefin-based polymer obtained by dissolution by a solvent.

Such graft reaction is normally carried out at a temperature of 60° C. to 350° C. Furthermore, the graft reaction may be conducted in the presence of an organic peroxide and a radical initiator such as azo compounds.

In the present invention, any of the aforesaid (A-1), (A-2), (A-3) and (A-4) may be used singly for the cyclic olefin-based polymer(a). They may also be used in combination of each other. Out of these, the α-olefin-cyclic olefin random copolymer (A-1) is preferable, and ethylene-tetracyclododecene copolymer or ethylene-norbornene copolymer is also preferable.

Next, an explanation is given of the polycyclohexane-based resin (b). Examples of the polycyclohexane-based resin (b) used in the present invention include a polycyclohexane obtained by hydrogenating the double bond in a polymer chain of the poly-1,3-cyclohexadiene obtained by polymerizing 1,3-cyclohexadiene using alkyllithium and amine as the initiators; the polymer obtained by hydrogenating a copolymer of 1,3-cyclohexadiene and α-olefin or styrene; the block copolymer obtained by hydrogenating such copolymer and block-copolymerizing butadiene as the soft segment to improve impact strength; the polymer obtained by hydrogenating a copolymer of α-olefin having 2 to 20 carbon atoms and aromatic vinyl compound such as styrene and α-alkylstyrene; and polycyclohexylethylene obtained by hydrogenating the benzene ring of a styrene-based polymer obtained by polymerizing styrene or α-alkylstyrene.

The polycyclohexylethylene used in the present invention shows the number-average molecular weight (Mn)/weight-average molecular weight (Mn) ratio (Mw/Mn), in terms of the molecular weight of polystyrene, of not more than 6, preferably not more than 5, more preferably not more than 3, much more preferably not more than 2.5. Further, the weight-average molecular weight of the polycyclohexylethylene is in the range of preferably 100,000 to 1,000,000, more preferably 20,000 to 700,000, much more preferably 50,000 to 500,000, especially preferably 70,000 to 300,000, at which the balance between strength and moldability is satisfactory.

The glass transition temperature is in the range of normally 50° C. to 300° C., preferably 60° C. to 280° C., more preferably 70° C. to 250° C., and the crystallinity is 0% to 20%, preferably 0% to 10%, more preferably 0% to 5%. The density is 0.80 to 1.50 g/cm$^3$, preferably 0.85 to 1.0 g/cm$^3$, more preferably 0.90 to 0.95 g/cm$^3$.

The aforesaid polycyclohexylethylene may be obtained by hydrogenating the aromatic ring of polystyrene, etc. by any method already known to the public. Any method already known to the public may be used for the method for the hydrogenation. Examples of such method include the methods disclosed in Japanese Patent Publications HEI 7-247321 and U.S. Pat. No. 5,612,422. The hydrogenation rate of the aromatic ring is preferably not less than 30%, more preferably not less than 60%, much more preferably not less than 90%.

In the present invention, other resin compositions to which another resin has been added may be used for the aforesaid polyolefin-based resin as required. Such another resin is added to such extent that the purpose of the present invention is not thwarted.

Here examples of such another resin that may be added to the polyolefin-based resin are listed as follows:

(1) Polymer derived from hydrocarbon having one or two unsaturated bonds:
Specific examples include polyolefins such as polyethylene, polypropylene, polymethylbutene-1, poly-4-methylpentene-1, polybutene-1 and polystyrene. Further, these polyolefins may have a crosslinked structure.

(2) Halogen-containing vinyl polymer:
Specific examples include polyvinyl chloride, polyvinylidene chloride, polyvinyl fluoride, polychloroprene and chlorinated rubber.

(3) Polymer derived from α,β-unsaturated acid and its derivatives:
Specific examples include polyacrylate, polymethacrylate, polyacrylamide, polyacrylonitrile, and copolymers of the monomers constituting the aforesaid polymers, whose examples include acrylonitrile-butadiene-styrene copolymer, acrylonitrile-styrene copolymer, and acrylonitrile-styrene-acrylic ester copolymer.

(4) Polymer derived from unsaturated alcohol and amine, or acyl derivatives of the alcohol or its acetal:
Specific examples include polyvinyl alcohol, polyvinyl acetate, polyvinyl stearate, polyvinyl benzoate, polyvinyl maleate, polyvinyl butyral, polyaryl phthalate, polyaryl melamine and copolymers with the monomers constituting the aforesaid polymers, whose examples include ethylene-vinyl acetate copolymer.

(5) Polymer derived from epoxide:
Specific examples include polymer derived from polyethylene oxide or bisglycidyl ether.

(6) Polyacetal:
Specific examples include polyoxymethylene, polyoxyethylene and polyoxymethylene that contains ethylene oxide as a comonomer.

(7) Polyphenylene oxide (8) Polycarbonate (9) Polysulfone

(10) Polyurethane and urea resin

(11) Polyamide and copolyamide derived from diamine and dicarboxylic acid and/or aminocarboxylic acid, or corresponding lactam:
Specific examples include nylon 6, nylon 66, nylon 11 and nylon 12.

(12) Polyester derived from dicarboxylic acid and dialcohol and/or oxycarboxylic acid, or corresponding lactone:
Specific examples include polyethylene terephthalate, polybutylene terephthalate and poly-1,4-dimethylol cyclohexane terephthalate.

(13) Polymer having a crosslinked structure which is derived fromaldehyde and phenol, urea or melamine:
Specific examples include phenol formaldehyde resin, urea formaldehyde resin and melamine formaldehyde.

(14) Alkyd resin:
Specific examples include glycerine phthalate resin.

(15) Unsaturated polyester resin and halogen-containing modified resin which are derived from copolyester of saturated/unsaturated dicarboxylic acid and multivalent alcohol and are obtained by using a vinyl compound as the crosslinking agent

(16) Natural polymer:
Specific examples include cellulose, rubber, protein or their derivatives, whose examples include cellulose acetate, cellulose propionate and cellulose ether.

(17) Soft polymer:
Specific examples include soft polymer containing a cyclic olefin component, α-olefin-based copolymer, α-olefin diene-based copolymer, aromatic vinyl-based hydrocarbon-conjugated diene-based soft copolymer and soft polymer or copolymer comprising isobutylene or isobutylene conjugated-diene.

In addition to the aforesaid components, those weathering stabilizers, heat stabilizers, antistatic agents, fire retardants, slip agents, antiblocking agents, antifogging agents, lubricators, dyes, pigments, natural oil, synthetic oil, wax and organic or inorganic fillers, which are already known to the public, may be added to the polyolefin-based resin used in the present invention to such extent that the purpose of the present invention is not thwarted.

For examples, examples of ultraviolet absorbers, out of the weathering stabilizers that may be added as an optional component, include benzophenone compounds, benzotriazole compounds, nickel compounds and hindered amine compounds. Specific examples of these include 2,2',4,4'-tetrahydroxybenzophenone, 2-(2'-hydroxy-3'-t-butyl-5'-butylphenyl)-5-chlorobenzotriazole, 2-(2'-hydroxy-3 '-t-butyl-5'-butylphenyl)benzotriazole, nickel salt of bis(3,5-di-t-butyl-4-hydroxybenzoyl phospholic acid ethylester, and bis(2,2',6,6'-tetramethyl-4-piperidine)sebacate.

Furthermore, examples of heat stabilizers that may be added as an optional component include phenol-based antioxidants such as tetrakis[methylene-3-(3,5-di-t-butyl-4-hydoxyphenyl)propionate]methane, β-(3,5-di-t-butyl-4-hydoxyphenyl)propionate alkylester, and 2,2'-oxamidbis [ethyl-3-(3,5-di-t-butyl-4-hydoxyphenyl)propionate], fatty acid metal salts such as zinc stearate, calcium stearate and 1,2-hydroxycalciumstearate and multivalent alcohol aliphatic ester such as glycerin monostearate, glycerin distearate, pentaerythritol monostearate, pentaerythritol distearate and pentaerythritol tristearate. In addition, phosphorus-based stabilizers such as distearylpentaerythritol diphosphite, phenyl-4,4'-isopropylidenediphenol-pentaerythritol diphosphite, bis(2,6-di-t-butyl-4-methylphenyl)pentaerythritol diphosphite, and tris (2,4-di-t-butylphenyl)phosphite may also be used for such heat stabilizers. These may be added singly or in combination with each other. As an example, the combination of tetrakis [methylene-3-(3,5-di-t-butyl-4-hydoxyphenyl)propionate] methane, zinc stearate and glycerin monostearatecanbecited. These stabilizers may be used singly or in combination of not less than two of them.

Methods already known to the public may be used for the method for mixing the polyolefin-based resin used in the present invention and other resin components or additives. Examples of such methods include the method in which all the components are mixed at the same time.

Sorbitol-based Derivatives

The sorbitol-based derivatives used in the present invention are the compounds represented by any of the following formulas (I-a) to (I-e):

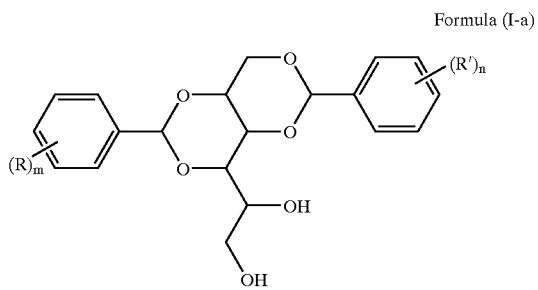

Formula (I-a)

(In the above formula (I-a), R and R', each of which may be the same or different, are any of an alkyl group having 1 to 8 carbon atoms, a halogen atom and an alkoxy group having 1 to 4 carbon atoms, and m and n are, each independently of each other, any of integers from 0 to 3.)

Specific examples of the compounds represented by the above formula (I-a) include 1,3,2,4-dibenzylidenesorbitol, 1,3-benzylidene-2,4-p-methylbenzylidenesorbitol, 1,3-benzylidene-2,4-p-ethylbenzylidenesorbitol, 1,3-p-methylbenzylidene-2,4-benzylidenesorbitol, 1,3-p-ethylbenzylidene-2,4-benzylidenesorbitol, 1,3-p-methylbenzylidene-2,4-p-ethylbenzylidenesorbitol, 1,3-p-ethylbenzylidene-2,4-p-methylbenzylidenesorbitol, 1,3,2,4-di(p-methylbenzylidene)sorbitol, 1,3,2,4-di(p-ethylbenzylidene)sorbitol, 1,3,2,4-di(p-n-propylbenzylidene)sorbitol, 1,3,2,4-di(p-i-propylbenzylidene)sorbitol, 1,3,2,4-di(p-n-butylbenzylidene)sorbitol, 1,3,2,4-di(p-s-butylbenzylidene) sorbitol, 1,3,2,4-di(p-t-butylbenzylidene)sorbitol, 1,3,2,4-di (2',4'-dimethylbenzylidene)sorbitol, 1,3,2,4-di(p-methoxybenzylidene)sorbitol, 1,3,2,4-di(p-ethoxybenzylidene)sorbitol, 1,3-benzylidene-2,4-p-chlorobenzylidenesorbitol, 1,3-p-chlorobenzylidene-2,4-benzylidenesorbitol, 1,3-pchloro benzylidene-2,4-p-methylbenzylidenesorbitol, 1,3-p-chlorobenzylidene-2,4-p-ethylbenzylidenesorbitol, 1,3-p-methylbenzylidene-2,4-p-chlorobenzylidenesorbitol, 1,3-p-ethylbenzylidene-2,4-p-chlorobenzylidenesorbitol and 1,3,2,4-di(p-chlorobenzylidene)sorbitol, and mixtures of not less than two of them. Especially, 1,3,2,4-dibenzylidenesorbitol, 1,3, 2,4-di(p-methylbenzylidene)sorbitol, 1,3,2,4-di(p-ethylbenzylidene)sorbitol, 1,3-p-chlorobenzylidene-2,4-p-methylbenzylidene sorbitol, and 1,3,2,4-di(p-chlorobenzylidene)sorbitol, and mixtures of not less than two of them may be used preferably.

Out of the aforesaid sorbitol-based derivatives, the compound represented by the following formula (X) can be cited as a preferable example:

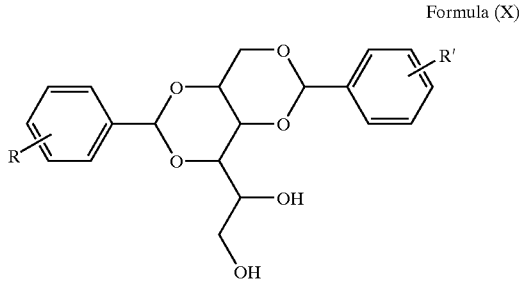

Formula (X)

(In the above formula (X), R and R', each of which may be the same or different, are a methyl group or an ethyl group.)

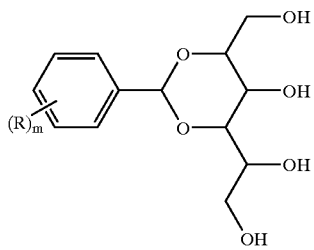

Formula (I-b)

(In the above formula (I-b), R, each of which may be the same or different, is any of an alkyl group having 1 to 8 carbon atoms, a halogen atom and an alkoxy group having 1 to 4 carbon atoms, and m is any of integers from 0 to 3.)

Specific examples of the compounds represented by the above formula (I-b) include 2,4-benzylidenesorbitol, 2,4-p-n-propylenzylidenesorbitol, 2,4-p-i-propylbenzylidenesorbitol, 2,4-p-n-butylbenzylidenesorbitol, 2,4-p-s-butylbenzylidenesorbitol, 2,4-p-t-butylbenzylidenesorbitol, 2,4-(2',4'-dimethylbenzylidene)sorbitol, 2,4-p-methoxybenzylidenesorbitol, 2,4-p-ethoxybenzylidenesorbitol and 2,4-p-chlorobenzylidenesorbitol, and mixtures of not less than two of these.

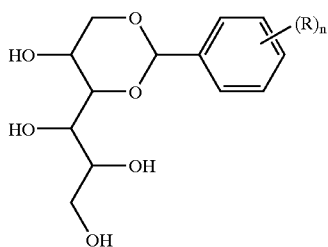

Formula (I-c)

(In the above formula (I-c), R, each of which may be the same or different, is any of an alkyl group having 1 to 8 carbon atoms, a halogen atom and an alkoxy group having 1 to 4 carbon atoms, and n is any of integers from 0 to 3.)

Specific examples of the compounds represented by the above formula (I-c) include 1,3-benzylidenesorbitol, 1,3-p-n-propylbenzylidenesorbitol, 1,3-p-i-propylbenzylidenesorbitol, 1,3-p-n-butylbenzylidenesorbitol, 1,3-p-s-butylbenzylidenesorbitol, 1,3-p-t-butylbenzylidenesorbitol, 1,3-(2',4'-dimethylbenzylidene)sorbitol, 1,3-p-methoxybenzylidenesorbitol, 1,3-p-ethoxybenzylidenesorbitol and 1,3-p-chlorobenzylidenesorbitol, and mixtures of not less than two of these.

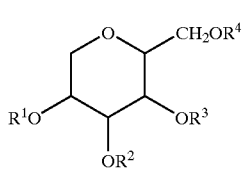

Formula (I-d)

(In the above formula (I-d), $R^1$ to $R^4$ are either the aliphatic acyl group having 10 to 30 carbon atoms or a hydrogen atom.)

Specific examples of the compounds represented by the above formula (I-d) include 1,5-sorbitanmonostealate, 1,5-sorbitandistealate, 1,5-sorbitantristealate, 1,5-sorbitanmonolaurate, 1,5-sorbitandilaurate, 1,5-sorbitantrilaurate, 1,5-sorbitanmonopalmitate, 1,5-sorbitandipalmitate and 1,5-sorbitantripalmitate, and mixtures of not less than two of these.

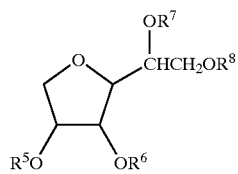

Formula (I-e)

(In the above formula (I-e), $R^5$ to $R^8$ are either the aliphatic acyl group having 10 to 30 carbon atoms or a hydrogen atom.)

Specific examples of the compounds represented by the above formula (I-e) include 1,4-sorbitanmonostealate, 1,4-sorbitandistealate, 1,4-sorbitantristealate, 1,4-sorbitanmonolaurate, 1,4-sorbitandilaurate, 1,4-sorbitantrilaurate, 1,4-sorbitanmonopalmitate, 1,4-sorbitandipalmitate and 1,4-sorbitantripalmitate, and mixtures of not less than two of these.

Out of the above sorbitol-based derivatives, the benzylidenesorbitol derivatives represented by the aforesaid formula (I-a) to (I-c) are preferable, and the dibenzylidenesorbitol derivatives represented by the aforesaid formula (I-a) are more preferable. Furthermore, the sorbitol derivatives represented by the aforesaid formula (I-a) to (I-e) may be used singly or in combination with not less than two of them.

In the present invention, the aforesaid sorbitol derivatives may be mixed before use with aliphatic acid to improve their dispersion properties. For an example of such aliphatic acid, aliphatic acid having 1 to 30 carbon atoms can be cited.

Resin Composition

The polyolefin-based resin composition of the present invention comprises the aforesaid polyolefin-based resin and sorbitol-based derivaties. The blending amount of the sorbitol-based derivatives is preferably 0.01 to 10 parts by weight, more preferably 0.05 to 5 parts by weight and much more preferably 0.05 to 3 parts by weight against 100 parts by weight of the polyolefin-based resin. If the blending amount is within the above range, the decline in the transparency in a high-temperature/high-humidity atmosphere will be little, without causing any change in the transparency or water absorption of the polyolefin-based resin.

For examples of the method for producing the polyolefin-based resin composition of the present invention, any methods already known to the public may be used. Specific examples include the method in which when the polyolefin-based resin is melted by use of an extruder, for example, or the resin previously melted passes through an extruder, the sorbitol-based derivatives to be added is charged into the extruder to be mixed so that pellets are obtained, and the method in which sheet, film, blow-molded particles, etc. are obtained directly by the such extruder.

As an example of the method not using an extruder, there is the method in which the sorbitol-based derivatives to be added is added into the polyolefin-based resin dissolved in a solvent, the solution is agitated, and the solvent is evaporated so that the resin composition is obtained. Further, the sorbitol-based derivatives may be added in the stage before the polyolefin-based resin passes an extruder, to such extent that this will cause any problem in the production of the resin.

Moreover, the method in which the powder or pellets of the polyolefin-based resin are impregnated with any of the sorbitol-based derivatives at raised temperature and pressure may also be used. Furthermore, these methods may be used in combination.

Even though the polyolefin-based resin composition thus obtained uses a transparent resin showing low water absorption, it enables moldings to be obtained that shows excellent transparency, suffers little decline in transparency or no whitening of the appearance when subjected to steam sterilization and high-temperature/high-humidity conditions, because it contains the sorbitol-based derivative of the present invention.

Moldings

For the method for producing the polyolefin-based resin moldings of the present invention, any methods already known to the public may be used. Examples of such methods include the methods in which a resin composition comprising the polyolefin-based resin and sorbitol-based derivative obtained as described above and as required other additives is formed into various moldings by such fabrication methods as extrusion molding, injection molding, injection compression molding, blow-film forming, blow-molding, extrusion blow molding, injection blow molding, press-molding, vacuum molding and calendering.

Given below is an explanation of such moldings, using several examples.

In the case of the molding of the present invention being an extruded product, there is no particular limits to its shape or product type. As examples of such products, sheet and film can be cited. In extruding a transparent resin composition, the extruders and molding conditions already known to the public may be used. For example, sheet and film, among other things, may be produced by extruding the melted transparent resin composition through a T die, etc. by means of a single-screw extruder, mixing extruder, ram extruder, gear extruder, etc.

Blown film may also be produced as an example of film-like product.

Injection-molded products may be produced by injection-molding the polyolefin-based resin composition into varied shape under normal molding conditions, using injection-molding machines already known to the public.

Since moldings comprising the polyolefin-based resin composition of the present invention show excellent transparency, heat resistance, rigidity and water vapor resistance, they may be used for such applications as transparent containers for food and pharmaceuticals. Especially since such moldings suffer little decline in transparency after storage in a high-temperature/high-humidity atmosphere, particularly after they are subjected to hot water treatment or steam treatment, they may be used preferably for optical products and for moldings for medical and pharmaceutical use. The aforesaid moldings are used for optical products for such applications as eyeglass lenses, pickup lenses, fθ lenses and other lenses for use in printers and copy machines, projection lenses of business equipment, plastic lenses for medical examination, reflectors, prisms, CD's, DVD's, MD's, MO's and other optical products for use as optical recording media, and such parts transmitting laser beams as optical fiber.

Examples of the moldings for medical and pharmaceutical use include medical instruments, medical containers, medical tools and pharmaceuticals packages. Especially, they are used for such applications as containers which are subjected to steam sterilization, including test tubes, vials, ampuls, tablet bottles, prefilled syringes, disposable syringes and other syringes, petri dishes, milk-bottles, food containers, bottles and sample tubes; liquid, powdery and solid pharmaceuticals containers such as infusion bags, eye drops containers and infusion medicine containers; samples containers such as sampling test tubes for blood examination, blood sampling tubes and test specimen containers; sterilizing containers for medical materials such as medical knives, forceps, gauze and contact lenses; medical instruments such as syringes; experimental apparatus such as beakers, petri dishes and flasks; and piping materials such as tubes for medical infusion liquids, tubing, fittings and valves.

EXAMPLES

In the following examples are described several preferred embodiments to illustrate the invention. However, it is to be understood that the invention is not intended to be limited to the specific embodiments.

The methods used in these examples to determine the physical properties are as follows:

(1) Light Transmittance and Haze:
 The light transmittance and haze were measured in accordance with the method of ASTM D1003. A rectangular plate, 130 mm×120 mm×3 mm (thickness), injection-molded by use of an injection-molding machine (IS-50 available from Toshiba Machine Co., Ltd.) set to a cylinder temperature of 270° C. and a mold temperature of 115° C. was used as the sample.

(2) Water Absorption:
 The rectangular plate molded in the same manner as described in (1) above was immersed in deionized water at 23° C. for 100 hr after it was dried under vacuum for 24 hr at 80° C. and 1 torr. Subsequently, the water attached to the rectangular plate taken out of water was wiped off the plate. After that, 2 g of the plate were cut off, and the water absorption was determined by measuring the water contained in the 2-g cut sample by the Karl Fischer method.

(3) Melt Flow Rate (MFR):
 The melt flow rate was measured at a temperature of 260° C. and a load of 2.16 kg in accordance with ASTM D1238.

(4) Glass Transition Temperature (Tg):
 The glass transition temperature was measured at a temperature rise rate of 10° C./min. by use of DSC-20, which is available from Seiko Denshi Kogyo Co., Ltd.

(4) Crystallinity:
 The crystallinity was measured by X-ray diffractometry.

Example 1

An Ethylene-tetracyclododecene Copolymer (tetracyclododecene unit content: 38 mol %; MFR: 40 g/min.; Tg: 135° C.; crystallinity: 0%) showing a total light transmittance of 90%, haze of 3% and water absorption of not more than 0.01% was used as the polyolefin-based resin. 100 parts by weight of the aforesaid resin and 2 parts by weight of 1,3,2,4-dibenzylidene sorbitol were melted and kneaded by means of a twin-screw extruder (TEX-44 available from The Japan Steel Works, Ltd.) at a cylinder temperature of 270° C. Using the resin composition obtained by the melting and kneading as described above, a rectangular plate, 130 mm×120 mm×3 mm (thickness), was injection-molded by use of an injection-molding machine (IS-50 available from Toshiba Machine Co., Ltd.) under the conditions of a cylinder temperature of 270° C. and a mold temperature of 115° C. After the molded plate was checked visually to confirm that there was no abnormality in its appearance, it was allowed to stand in an atmosphere at a temperature of 80° C. and a relative humidity of 90% for 48 hours. The haze and spectral transmittance of the plate at a wavelength of 600 nm were measured before and after it was allowed to stand as described above, and the differences therein were determined.
Results are shown in the Table.

Examples 2 Through 4

The same operations as described in Example 1 were performed except that the parts by weight shown in the Table below of 1,3,2,4-di(p-methylbenzylidene)sorbitol was used against 100 parts by weight of the polyolefin-based resin in place of 2 parts by weight of 1,3,2,4-dibenzylidene sorbitol. Results of evaluation are shown in the Table.

Example 5

The same operaions as described in Example 1 were performed except that 1,3,2,4-di(p-ethylbenzylidene)sorbitol was used in place of 1,3,2,4-dibenzylidene sorbitol. Results of evaluation are shown in the Table.

Comparative Example 1

The same operations as described in Example 1 were performed, using the ethylene-tetracyclododecene copolymer used in Example 1 for the polyolefin-based resin, without adding 1,3,2,4-dibenzylidene sorbitol. Results of evaluation are shown in the Table.

Example 6

An ethylene-tetracyclododecene copolymer (tetracyclododecene unit content: 38 mol %; MFR: 40 g/min.; Tg: 135° C.; crystallinity: 0%) showing a total light transmittance of 90%, haze of 3% and water absorption of not more than 0.01% was used as the polyolefin-based resin. 100 parts by weight of the aforesaid resin and 2 parts by weight of 1,3,2,4-dibenzylidene sorbitol were melted and kneaded by means of a twin-screw extruder (TEX-44 available from The Japan Steel Works, Ltd.) at a cylinder temperature of 270° C. Using the resin composition obtained by the melting and kneading as described above, a rectangular plate, 130 mm×120 mm×3 mm (thickness), was injection-molded by use of an injection-molding machine (IS-50 available from Toshiba Machine Co., Ltd.) under the conditions of a cylinder temperature of 270° C. and a mold temperature of 115° C. After the molded plate was checked visually for its appearance, it was subjected to steam sterilization at a temperature of 121° C. for 20 minutes. The haze and spectral transmittance of the plate at a wavelength of 600 nm were measured before and after it was subjected to steam sterilization as described above, and the differences therein were determined. Results are shown in the Table.

Example 7

The same operations as described in Example 6 were performed except that 1,3,2,4-di(p-methylbenzylidene) sorbitol was used in place of 1,3,2,4-dibenzylidene sorbitol. Results of evaluation are shown in the Table.

Example 8

The same operations as described in Example 6 were performed except that 1,3,2,4-di(p-ethylbenzylidene) sorbitol was used in place of 1,3,2,4-dibenzylidene sorbitol. Results of evaluation are shown in the Table.

Comparative Example 2

The same operations as described in Example 6 were performed except that the same ethylene-tetracyclododecene copolymer used in Example 6 was used for the polyolefin-based resin and that 1,3,2,4-dibenzylidene sorbitol was not added. Results of evaluation are shown in the Table.

Example 9

The same operations as described in Example 1 were performed except that a mixture of 1,5-sorbitanmonostearate and 1,4-sorbitanmonostearate was used in place of 1,3,2,4-dibenzylidene sorbitol. Results of evaluation are shown in the Table.

Example 10

The same operations as described in Example 1 were performed except that a mixture of 1,5-sorbitanmonolaurate and 1,4-sorbitanmonolaurate was used in place of 1,3,2,4-dibenzylidene sorbitol. Results of evaluation are shown in the Table.

Example 11

Polycyclohexylethylene (total light transmittance: 91%; haze: 3%; water absorption: not more than 0.01%; and crystallinity: 0%) obtained by hydrogenating 100 g of polystyrene (G590 available from Nihon Polystyrene Co., Ltd.; MFR (as measured at a temperature of 200° C. and a load of 5 kg): 3 g/10 min.) in the cyclohexane solvent at a temperature of 100° C. and a pressure of 40 kg/cm$^2$ for 2 hours in the presence of Ni(acac)$_2$ and triisobutyl aluminum as the catalysts was used as the polyolefin-based resin. 100 parts by weight of the aforesaid resin and 2 parts by weight of 1,3,2,4-di(p-methylbenzylidene)sorbitol were melted and kneading by means of a Labo Plastomill and molded into a press-molded plate, 30 mm×30 mm×3 mm (thickness), at a temperature of 280° C. This square plate was evaluated in the same manner as described in Example 1. Results are shown in the Table.

Comparative Example 3

The same operations as described in Example 11 were performed, using the same polyolefin-based resin as the used in Example 11, except that 1,3,2,4-di(p-methylbenzylidene) sorbitol was not added. Results of evaluation are shown in the Table.

TABLE

| | Example No. | | | | | | | | | | | Comparative Example No. | | |
|---|---|---|---|---|---|---|---|---|---|---|---|---|---|---|
| | 1 | 2 | 3 | 4 | 5 | 6 | 7 | 8 | 9 | 10 | 11 | 1 | 2 | 3 |
| Polyolefin-based resin | E/TD | E/TD | E/TD | E/TD | E/TD | E/TD | E/TD | E/TD | E/TD | E/TD | PCHE | E/TD | E/TD | PCHE |
| Addition amount of (1) | 2 | — | — | — | — | 2 | — | — | — | — | — | — | — | — |
| sorbitol-based (2) | — | 2 | 1.5 | 1 | — | — | 2 | — | — | — | 2 | — | — | — |
| derivative (3) | — | — | — | — | 2 | — | — | 2 | — | — | — | — | — | — |
| (parts by weight) (4) | — | — | — | — | — | — | — | — | 2 | — | — | — | — | — |
| (5) | — | — | — | — | — | — | — | — | — | 2 | — | — | — | — |
| ΔHaze (%) | 0 | 0 | 1 | 2 | 0 | 0 | 0 | 0 | 0 | 0 | 0 | 3.5 | 3 | 5 |
| ΔTr (600 nm) (%) | 0 | 0 | 0.5 | 1 | 0 | 0 | 0 | 0 | 0 | 0 | 0 | 2 | 1.5 | 2 |

In the above Table:
E/TD: Ethylene-tetracyclododecene copolymer   PCHE: Polycyclohexylethylene
Sorbitol-based derivative (1): 1,3,2,4-dibenzylidene sorbitol
Sorbitol-based derivative (2): 1,3,2,4-di(p-methylbenzylidene)sorbitol
Sorbitol-based derivative (3): 1,3,2,4-di(p-ethylbenzylidene)sorbitol
Sorbitol-based derivative (4): A mixture of 1,5-sorbitanmonostearate and 1,4-sorbitanmonostearate.
Sorbitol-based derivative (5): A mixture of 1,5-sorbitanmonolaurate and 1,4-sorbitanmonolaurate.
ΔHaze: (Haze after test) - (haze before test) (%)
ΔTr (600 nm): (Spectral transmittance before test) - (spectral transmittance after test) (%)

What we claim is:

1. A cyclic olefin-based resin composition comprising:

a cyclic olefin-based resin having crystallinity of 0% to 20% which shows haze of not more than 10% and total light transmittance of not less than 80%, when measured in accordance with ASTM D1003 using an article 3 mm thick molded therefrom as the test specimen, and shows water absorption of not more than 0.1% after 100-hour immersion in water at 23° C., and a sorbitol-based derivative which is represented by any of the following general formulas I-a to I-e:

Formula I-a

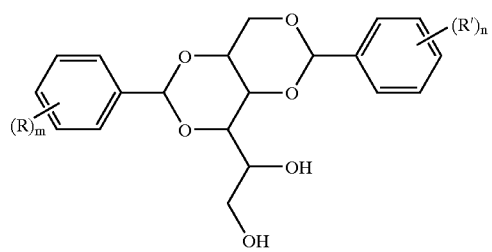

Formula I-b

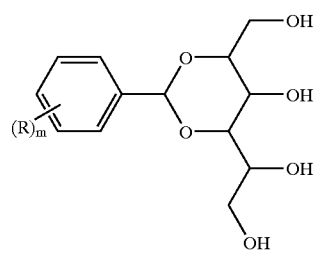

-continued

Formula I-c

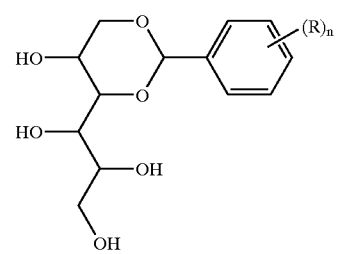

wherein R and R', each of which may be the same or different, are any of an alkyl group having 1 to 8 carbon atoms, a halogen atom and an alkoxy group having 1 to 4 carbon atoms, and m and n are, each independently of each other, any of integers from 0 to 3;

Formula I-d

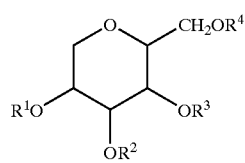

Formula I-e

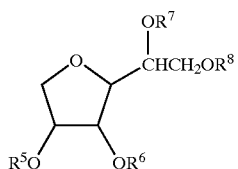

wherein $R^1$ and $R^8$ are either an aliphatic acyl group having 10 to 30 carbon atoms or a hydrogen atom.

2. A cyclic olefin-based resin composition as claimed in claim 1, wherein the cyclic olefin-based resin comprises at least one of (a) cyclic olefin-based polymer selected from the group consisting of A-1, A-2, A-3 and A-4 and (b) a polycyclohexane-based resin;

wherein A-1 an α-olefin-cyclic olefin random copolymer obtained by copolymerizing α-olefin having 2 to 20 carbon atoms and the cyclic olefin represented by the following formula II or III:

Formula II

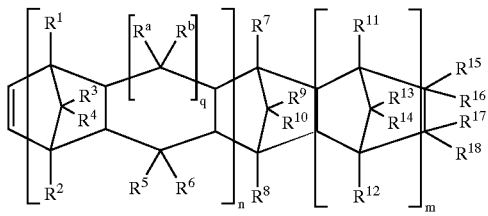

Formula II

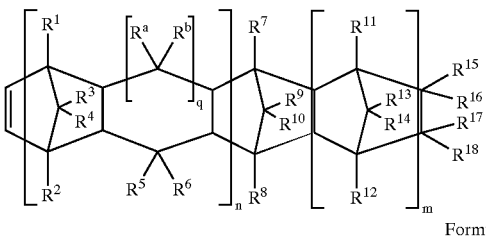

wherein, n is 0 to 1, m is integers of 0 or a number not less than 1, q is 0 or 1, $R^1$ to $R^{18}$ and $R^a$ and $R^b$ are, each independently of each other, a hydrogen atom, a halogen atom or a hydrocarbon group, and $R^{15}$ to $R^{18}$ may be bonded with each other to form a monocyclic or polycyclic ring, while the said monocyclic or polycyclic ring may have a double bond or $R^{15}$ and $R^{16}$, or R17 and $R^{18}$, may form an alkylidene group Formula III

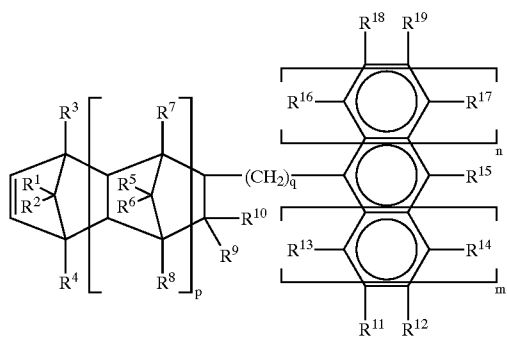

Formula III

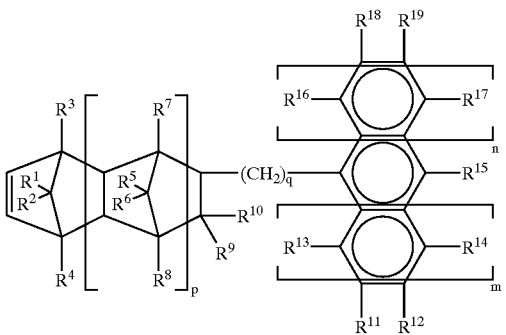

wherein, p and q are integers of 0 or a number not less than 1, m and n are 0, 1 or 2, $R^1$ to $R^{19}$ are, each independently of each other, a hydrogen atom, a halogen atom, an aliphatic hydrocarbon group an alicyclic hydrocarbon group, an aromatic hydrocarbon group or an alkoxy group, while the carbon atom to which $R^9$ and $R^{10}$ are attached and the carbon atom to which $R^{13}$ or $R^{11}$ is attached may be bonded directly or via an alkylene group having 1 to 3 carbon atoms and, when n=m=0, $R^{15}$ and $R^{12}$, or $R^{15}$ and $R^{19}$, may be bonded with each other to form a monocyclic or polycyclic aromatic ring; and A-2 is a ring-opening polymer or copolymer of the cyclic olefin represented by the above formula II or III, A-3 is a hydride of the ring-opening polymer or copolymer of (A-2) above, and A-4 is a graft-modified material of A-1, A-2 or A-3 above.

3. A cyclic olefin-based resin composition which comprises at least one of the cyclic olefin-based polymers selected from the group consisting of the following A-1, A-2, A-3 and A-4 and the sorbitol-based derivative represented by formulas I-a to I-e as defined in claim 1:

wherein (A-1) is an α-olefin-cyclic olefin random copolymer obtained by copolymerizing α-olefin having 2 to 20 carbon atoms and the cyclic olefin represented by the formula (II) or (III);

(A-2) is a ring-opening polymer or copolymer of the cyclic olefin represented by the above formula II or III A-3 is a hydride of the ring-opening polymer or copolymer of A-2 as defined above; and A-4 is a graft-modified material of A-1, A-2 or A-3 as defined above.

4. A cyclic olefin-based resin composition as claimed in claim 1, wherein the sorbitol-based derivative is a dibenzylidene sorbitol derivative represented by the formula (I-a) as defined in claim 1.

5. A cyclic olefin-based resin composition as claimed in claim 1, which contains 0.01 to 10 parts by weight of a sorbitol-based derivative against 100 parts by weight of the cyclic olefin-based resin.

6. A cyclic olefin-based resin composition molding, which is formed from the cyclic olefin-based resin described in claim 1.

7. A cyclic olefin-based resin composition molding as claimed in claim 6, wherein the molding is an optical product.

8. A cyclic olefin-based resin composition molding as claimed in claim 6, wherein the molding is a molding for medical and pharmaceutical use.

9. A cyclic olefin-based resin composition as claimed in claim 1, wherein the cyclic olefin-based resin has a glass transition temperature (Tg) of at least 70° C.

10. A cyclic olefin-based resin composition as claimed in claim 1, wherein the cyclic olefin-based resin has a melt flow at 260° C. and a load of 2.16 kg in accordance with ASTM D1238 is about 0.1 to 200 g/10 mins.

11. A cyclic olefin-based resin composition as claimed in claim 1, wherein the cyclic olefin-based resin has a softening point of at least 30° C. as measured by the thermal mechanical analyzer (TMA).

12. A cyclic olefin-based resin composition as claimed in claim 1, wherein the sorbitol based derivative is selected from the group consisting of 1,3,2,4-dibenzylidenesorbitol, 1,3-benzylidene-2,4-p-methylbenzylidenesorbitol, 1,3-benzylidene-2,4-p-ethylbenzylidenesorbitol, 1,3-p-methylbenzylidene-2,4-benzylidenesorbitol, 1,3-p-ethylbenzylidene-2,4-benzylidenesorbitol, 1,3-p- methylbenzylidene-2,4-p-ethylbenzylidenesorbitol, 1,3-p-ethylbenzylidene-2,4-p-methylbenzylidenesorbitol, 1,3,2,4-di(p-methylbenzylidene)sorbitol, 1,3,2,4-di(p-ethylbenzylidene)sorbitol, 1,3,2,4-di(p-n-propylbenzylidene)sorbitol, 1,3,2,4-di(p-i-propylbenzylidene)sorbitol 1,3,2,4-di(p-n-butylbenzylidene)sorbitol, 1,3,2,4-di(p-s-butylbenzylidene)sorbitol, 1,3,2,4-di(p-t-butylbenzylidene)sorbitol, 1,3,2,4-di(2',4'-dimethylbenzylidene)sorbitol, 1,3,2,4-di(p-methoxybenzylidene)sorbitol, 1,3,2,4-di(p-ethoxybenzylidene)sorbitol, 1,3-benzylidene-2,4-p-chlorobenzylidenesorbitol, 1,3-p-chlorobenzylidene-2,4-benzylidenesorbitol, 1,3-p-chlorobenzylidene-2,4-p-methylbenzylidenesorbitol, 1,3-p-chlorobenzylidene-2,4-p-ethylbenzylidenesorbitol, 1,3-p-methylbenzylidene-2,4-p-chlorobenzylidenesorbitol, 1,3-p-ethylbenzylidene-2,4-p-chlorobenzylidenesorbitol and 1,3,2,4-di(p-chlorobenzylidene)sorbitol, and mixtures comprising not less than two of the above.

13. A cyclic olefin-based resin composition as claimed in claim 1, wherein the sorbitol based derivative is represented by the formula X,

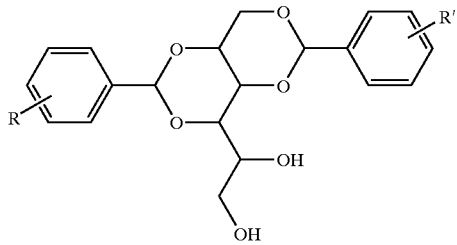

wherein R an R', each may be the same or different and are a methyl group or an ethyl group.

14. A cyclic olefin-based resin composition as claimed in claim 1, wherein the sorbitol based derivative is in a blending amount of 0.01 to 10 parts by weight of 100 parts by weight of the cyclic olefin-based derivative.

15. A cyclic olefin-based resin composition as claimed in claim 1, wherein the sorbitol based derivative is in a blending amount of 0.05 to 5 parts by weight of 100 parts by weight of the cyclic olefin-based derivative.

16. A cyclic olefin-based resin composition as claimed in claim 1, wherein the sorbitol based derivative is in a blending amount of 0.05 to 3 parts by weight of 100 parts by weight of the cyclic olefin-based derivative.

* * * * *